(12) United States Patent
Naidu et al.

(10) Patent No.: US 10,457,273 B2
(45) Date of Patent: Oct. 29, 2019

(54) METHOD AND SYSTEM FOR PROVIDING TORQUE-ASSIST

(71) Applicant: FORD GLOBAL TECHNOLOGIES, LLC, Dearborn, MI (US)

(72) Inventors: Ashish Kumar Naidu, Basildon (GB); Ian Halleron, Chelmsford (GB); Peter George Brittle, Romford (GB); James Wright, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 286 days.

(21) Appl. No.: 15/454,239

(22) Filed: Mar. 9, 2017

(65) Prior Publication Data

US 2017/0259807 A1    Sep. 14, 2017

(30) Foreign Application Priority Data

Mar. 9, 2016  (GB) .................................. 1604048.7
Mar. 9, 2016  (IN) ............................. 201641008160

(51) Int. Cl.
*B60W 20/15*   (2016.01)
*F02M 26/35*   (2016.01)
(Continued)

(52) U.S. Cl.
CPC ............. *B60W 20/15* (2016.01); *B60K 6/485* (2013.01); *B60W 10/06* (2013.01); *B60W 10/08* (2013.01);
(Continued)

(58) Field of Classification Search
CPC ... Y02T 10/6226; Y02T 10/144; Y02T 10/47; Y02T 10/6221; Y02T 10/6286; B60Y 2400/442; Y10S 903/902; B60W 2510/06; B60W 2710/083; B60W 2710/06; B60W 20/15; B60W 10/06; B60W 10/08;
(Continued)

(56) References Cited

U.S. PATENT DOCUMENTS 6,698,408 B2   3/2004  McConnell
8,230,843 B2   7/2012  Kurtz
(Continued)

FOREIGN PATENT DOCUMENTS

AT           8055 U1   1/2006
JP     2005048623 A    2/2005
(Continued)

OTHER PUBLICATIONS

Toyota Motor, Goggle translation of JP 2008 280013 A, 2008 (Year: 2008).*

(Continued)

*Primary Examiner* — Frederick M Brushaber
(74) *Attorney, Agent, or Firm* — David Kelley; Brooks Kushman P.C.

(57) ABSTRACT

A system and method for providing torque-assist to a rotary shaft of an internal combustion engine control an electric machine in response to operation of an exhaust gas recirculation (EGR) valve to assist the rotation of the rotary shaft. The system and method facilitate periodic operation of the EGR valve to purge condensation without objectionable torque reduction when the engine is operating near full load.

19 Claims, 3 Drawing Sheets

(51) Int. Cl.
  *F02D 41/00* (2006.01)
  *B60W 20/19* (2016.01)
  *B60K 6/485* (2007.10)
  *B60W 20/00* (2016.01)
  *F02B 37/00* (2006.01)
  *B60W 10/06* (2006.01)
  *F02M 26/06* (2016.01)
  *B60W 10/08* (2006.01)
  *F02D 41/38* (2006.01)

(52) U.S. Cl.
  CPC ......... *F02D 41/0055* (2013.01); *F02M 26/06* (2016.02); *B60W 2510/06* (2013.01); *B60W 2710/06* (2013.01); *B60W 2710/083* (2013.01); *F02D 41/38* (2013.01); *F02D 2041/389* (2013.01); *Y10S 903/902* (2013.01)

(58) Field of Classification Search
  CPC ....... B60W 20/19; B60W 20/00; F02D 41/38; F02D 2200/60; F02D 2250/24; F02D 2250/22; F02D 2250/18; F02D 2200/1002; F02D 2041/389; F02D 41/0065; F02D 41/0007; F02D 41/0055; F02M 26/35; F02M 26/06; B60K 6/48; B60K 6/485; F02B 37/00
  See application file for complete search history.

(56) References Cited

U.S. PATENT DOCUMENTS

| | | | |
|---|---|---|---|
| 8,452,473 B2* | 5/2013 | Ganley | B60K 6/485 |
| | | | 180/65.1 |
| 8,897,988 B2* | 11/2014 | Worthing | F02D 11/105 |
| | | | 123/361 |
| 8,961,368 B2 | 2/2015 | Glugla | |
| 9,228,508 B2* | 1/2016 | Blumendeller | F02D 21/08 |
| 9,321,450 B2* | 4/2016 | DeGroot | B60W 20/10 |
| 9,493,151 B2* | 11/2016 | Kato | B60K 6/445 |
| 9,534,530 B2* | 1/2017 | Glugla | F02D 41/0082 |
| 9,765,621 B2* | 9/2017 | Huang | F02D 41/1406 |
| 9,874,164 B2* | 1/2018 | Hu | F02D 43/00 |
| 9,963,140 B2* | 5/2018 | Orlannunder | B60K 6/48 |
| 2004/0084015 A1* | 5/2004 | Sun | F02D 35/0007 |
| | | | 123/399 |
| 2006/0224282 A1* | 10/2006 | Seo | B60K 6/365 |
| | | | 701/22 |
| 2006/0270519 A1 | 11/2006 | Kamada et al. | |
| 2009/0090106 A1* | 4/2009 | Muller | F02B 37/12 |
| | | | 60/602 |
| 2012/0203411 A1* | 8/2012 | Mallebrein | B60K 6/48 |
| | | | 701/22 |
| 2014/0109568 A1 | 4/2014 | Glugla et al. | |
| 2014/0109870 A1 | 4/2014 | Glugla et al. | |
| 2014/0150755 A1 | 6/2014 | Cunningham et al. | |
| 2014/0260242 A1 | 9/2014 | Chadwell et al. | |
| 2014/0260243 A1 | 9/2014 | Zhang | |
| 2015/0345371 A1* | 12/2015 | Russ | F02B 37/162 |
| | | | 123/542 |
| 2017/0051707 A1* | 2/2017 | Wright | F02M 26/46 |
| 2017/0259807 A1* | 9/2017 | Naidu | B60W 20/19 |
| 2017/0282901 A1* | 10/2017 | Imamura | B60W 20/15 |
| 2017/0335780 A1* | 11/2017 | Dixon | F02M 26/05 |
| 2018/0334042 A1* | 11/2018 | Orozco | B60L 1/003 |
| 2019/0032590 A1* | 1/2019 | Conis | F02D 41/221 |

FOREIGN PATENT DOCUMENTS

| | | |
|---|---|---|
| JP | 2006009736 A | 1/2006 |
| JP | 2008280013 A | 11/2008 |
| JP | 2009149229 A | 7/2009 |

OTHER PUBLICATIONS

Great Britain Search and Examination Report for Great Britain Application No. GB1604048.7 dated Sep. 8, 2016.
Extended European Search Report for European Application No. 17158244.8 dated Jul. 13, 2017.

* cited by examiner

METHOD AND SYSTEM FOR PROVIDING TORQUE-ASSIST

CROSS-REFERENCE TO RELATED APPLICATIONS

This application claims foreign priority benefits under 35 U.S.C. § 119(a)-(d) to GB Application 1604048.7 filed Mar. 9, 2016 and IN Application 2016 41 00 81 60 filed Mar. 9, 2016, which is hereby incorporated by reference in its entirety.

TECHNICAL FIELD

This disclosure relates to a method of providing torque-assist to a rotary shaft of an internal combustion engine, which may include a turbocharged internal combustion engine.

BACKGROUND

A high proportion of vehicle engines are fitted with turbochargers to improve performance as well as fuel efficiency and emissions levels. Engines which are fitted with turbochargers often incorporate an exhaust gas recirculation (EGR) system, which further reduces emissions values by recirculating a portion of the exhaust gases back to the inlet of the engine. In a low pressure EGR (LP-EGR) system the exhaust gases are reintroduced upstream of the turbocharger compressor inlet. The pressure at this location is low, even in high engine boost conditions, which allows for the low pressure recirculation of the exhaust gases. In contrast, in a high pressure EGR (HP-EGR) system the exhaust gases are reintroduced downstream of the turbocharger compressor outlet and hence exhaust gases must be recirculated at a higher pressure. Some vehicles are fitted with twin turbochargers, which work in series to increase the pressure of inlet gases and recirculated exhaust gases. High pressure EGR gases may be reintroduced upstream or downstream of the second compressor. In order to control the flow of EGR gases, the EGR system may have one or more EGR valves configured to control the reintroduction of the EGR gases back to the inlet of the engine.

When an engine equipped with an EGR system is operating at or close to full load, for example maximum torque output, the EGR valve will typically be closed, reducing the EGR flow to zero. When the EGR valve is closed, condensation can form upstream of the valve as the EGR gases and system cool. When the torque demand on the engine is reduced, the EGR valve opens to reintroduce the EGR gases back to the inlet of the engine. As a result, the condensate that has accumulated upstream of the EGR valve is discharged through the valve and into the inlet of the engine. Such a discharge of condensate is undesirable, especially for an LP EGR system as a large quantity of condensate can damage the compressor of the turbocharger.

One solution is to periodically open the EGR valve, for example for 3 seconds every 30 seconds, to evaporate and discharge the accumulated condensation and to reheat the EGR system, which helps to reduce the rate of condensation. However, at or near full engine load, opening of the EGR valve reduces the air available for combustion and thus results in a torque disturbance which is noticeable by the driver.

SUMMARY

According to an aspect of the present disclosure there is provided a method of providing torque-assist to a rotary shaft of an internal combustion engine, the method comprising: assisting the rotation of the rotary shaft using an electric machine in response to the operation of an exhaust gas recirculation valve. The rotary shaft may be any rotary shaft of the engine that may be driven by the electric machine. For example, the rotary shaft may be a crankshaft, a camshaft, a balancer shaft, or any other appropriate rotary shaft of the engine. The torque-assist may be provided to reduce and/or smooth a torque dip in the output torque of the engine caused by the operation of the exhaust gas recirculation valve. The rotation of the rotary shaft may be assisted by applying torque to the rotary shaft from the electric machine. The assistance provided by the electric machine may be adjusted dependent on the state of opening of the exhaust gas recirculation valve.

The method may comprise reducing the quantity of fuel injected into a cylinder of the engine as a result of the operation of the exhaust gas recirculation valve. For example, the operation of the exhaust gas recirculation valve may cause a reduction in the proportion of oxygen in the gases that enter the intake of the engine. As a result, the quantity of fuel injected into the cylinder may be reduced, for example in an attempt to achieve a desired air to fuel ratio of the reactants in a combustion chamber of the cylinder. The method may comprise assisting the rotation of the rotary shaft using the electric machine as a result of reducing the quantity of fuel injected into the cylinder.

The operational profile of the exhaust gas recirculation valve may be defined by at least one of: the extent by which the exhaust gas recirculation valve is opened, the flow rate of gas through the exhaust gas recirculation valve, the period for which the exhaust gas recirculation is open, i.e. the period in between the valve first allowing gases to flow through the valve and the valve preventing gas flow, and the rate by which the exhaust gas recirculation valve is opened and/or closed.

The operational profile of the electric machine may be a function of at least one of the factors that define the operational profile of the exhaust gas recirculation valve. The amount of torque assistance provided by the electric machine may be a function of the period for which the exhaust gas recirculation valve is open. The amount of torque assistance provided by the electric machine may be a function of the extent by which the exhaust gas recirculation valve opens. The amount of torque assistance provided by the electric machine may be a function of the flow rate of gas through the exhaust gas recirculation valve. The amount of torque assistance provided by the electric machine may be a function of the rate by which the exhaust gas recirculation valve is opened and/or closed. There may be a delay between the opening of the exhaust gas recirculation valve and assisting the rotation of the rotary shaft using the electric machine. For example, the activation of the electric machine may be delayed by the period taken for the recirculated exhaust gases to reach the combustion chamber of the cylinder.

The method may comprise reducing the amount of torque assistance provided by the electric machine in response to a request to reduce output torque of the engine. For example, where the electric machine has been activated to assist the rotation of the rotary shaft, and the driver requests a reduction in the output torque of the engine, the method may comprise reducing the amount of torque assistance provided by the electric machine, or deactivating the electric machine so that the torque-assist is no longer provided.

According to another aspect of the present disclosure there is provided a method of providing torque-assist to a rotary shaft of an internal combustion engine, the method comprising: assisting the rotation of the rotary shaft by applying torque to the rotary shaft from an electric machine, the assistance provided by the electric machine being adjusted dependent on the state of opening of an exhaust gas recirculation valve.

According to another aspect of the present disclosure there is provided a torque-assist system for an internal combustion engine, the torque-assist system comprising: an exhaust gas recirculation valve; an electric machine coupled to a rotary shaft of the engine; and a controller configured to activate the electric machine as a result of, for example in response to, the operation of the exhaust gas recirculation valve.

The electric machine may be coupled to the crankshaft of the engine. The electric machine may be rigidly coupled to the crankshaft of the engine. The electric machine may be coupled to the crankshaft of the engine by virtue of one or more intermediary members, such as an accessory drive member. The electric machine may be coupled to the crankshaft at a front end of the engine, for example an end of the engine to which a synchronous drive and/or one or more accessory drives are coupled.

The torque-assist system may comprise a controller configured to operatively connect an exhaust gas recirculation system to a fuel system of the engine and/or the electric machine.

The exhaust gas recirculation valve may control the flow of exhaust gas into the compressor of a forced induction device of the engine. For example, the exhaust gas recirculation valve may control the flow of exhaust gas into a turbocharger and/or a supercharger. The exhaust gas recirculation valve may control the flow of exhaust gas into the air intake of the engine. The exhaust gas recirculation valve may control the flow of exhaust gas directly into the intake manifold of the engine. The electric machine may be coupled to the crankshaft of the engine by virtue of one or more intermediary members.

An engine may be provided comprising at least one of the above mentioned torque-assist systems.

The disclosure also provides software, such as a computer program or a computer program product for carrying out any of the methods described herein, and a computer readable medium having stored thereon a program for carrying out any of the methods described herein. A computer program embodying the disclosure may be stored on a computer-readable medium, or it could, for example, be in the form of a signal such as a downloadable data signal provided from an Internet website, or it could be in any other form.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

For a better understanding of the present disclosure, and to show more clearly how it may be carried into effect, reference will now be made, by way of example, to the accompanying drawings, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
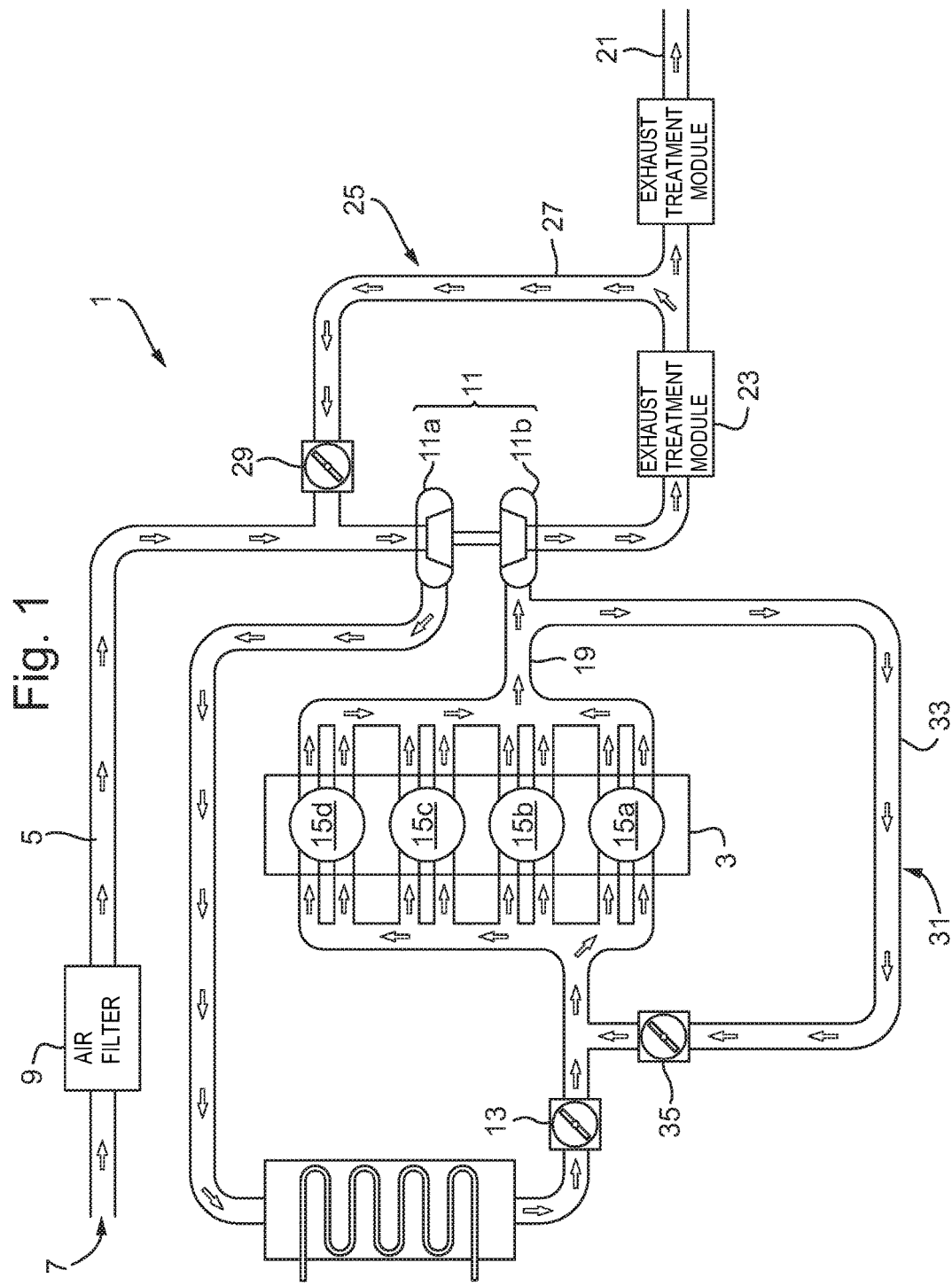
FIG. 1 shows a schematic diagram of an engine for a vehicle.

With reference to FIG. 1, an engine assembly 1 for an internal combustion engine 3 of a motor vehicle according to arrangements of the present disclosure is described. Air may enter an air inlet duct 5 through an inlet 7 and then pass through an air filter 9. The air may then pass through a compressor 11a of a forced induction device, for example a turbocharger 11. The turbocharger 11 may improve the engine power output and reduce emissions. Typically, the turbocharger 11 is arranged with an exhaust gas driven turbine 11b driving the compressor 11a mounted on the same shaft. A charge air cooler may be provided downstream of the turbocharger compressor 11a. The charge air cooler may further increase the density of the air entering the internal combustion engine 3, thereby improving its performance. The air may then enter the internal combustion engine 3 via a throttle 13 configured to vary the mass flow of air into the internal combustion engine.

In a particular arrangement of the present disclosure, the internal combustion engine 3 comprises a diesel engine, however, it is equally envisaged that the engine 3 may be a spark ignition engine. As is depicted in FIG. 1, the internal combustion engine 3 may comprise a number of cylinders 15a-d and the air may flow into each of these cylinders at an appropriate time in the engine's cycle as determined by one or more valves (not shown).

The exhaust gases leaving the internal combustion engine 3 may enter an exhaust duct 19 configured to receive exhaust gases from the engine and exhaust them via an exhaust outlet 21. Exhaust gases within the exhaust duct 19 may pass through the turbine 11b of the turbocharger. One or more exhaust treatment modules 23 may be provided downstream of the turbine 11b, e.g. to reduce emissions from the engine exhaust.

A first exhaust gas recirculation loop 25, for example a low pressure exhaust gas recirculation (LP-EGR) loop, configured to selectively recirculate exhaust gases from the internal combustion engine 3 back into the internal combustion engine may also be provided. The first exhaust gas recirculation loop 25 may be provided about the turbocharger 11 such that exhaust gases leaving the turbine 11b may be recirculated into the inlet of compressor 11a. The first exhaust gas recirculation loop 25 may comprise a first exhaust gas recirculation duct 27, which may branch from the main exhaust flow path, e.g. exhaust gases may be diverted from the main exhaust flow path to flow through the first exhaust gas recirculation duct 27. The first exhaust gas recirculation duct 27 may branch from the main exhaust flow path downstream of the exhaust treatment module 23 (and upstream of the further exhaust treatment module if provided). The first exhaust gas recirculation loop 25 may further comprise a first recirculation valve 29, which may control the amount of recirculation through the first exhaust gas recirculation duct 27. In the arrangement shown in FIG.

1, the first recirculation valve 29 controls the flow of exhaust gas recirculation into the turbocharger compressor 11a. In addition, an exhaust gas cooler (not shown) may be provided in the exhaust gas recirculation loop 25 to cool gases within the first exhaust gas recirculation loop 25.

A second EGR loop 31, for example a high pressure exhaust gas recirculation (HP-EGR) loop, configured to selectively recirculate exhaust gases from the internal combustion engine 3 back into the internal combustion engine may also be provided. The second EGR loop 31 may be provided about the engine 3 with exhaust gases leaving the engine 3 being recirculated to the air inlet of the engine 3, for example directly into the intake manifold of the engine. The second exhaust gas recirculation loop 31 may comprise a second exhaust gas recirculation duct 33, which may branch from the main exhaust flow path, e.g. gases may be diverted from the main exhaust flow path to flow through the second exhaust gas recirculation duct 33. The second exhaust gas recirculation duct 33 may branch from the main exhaust flow path at a point between the engine 3 and the turbine 11b of the turbocharger. Accordingly, the exhaust gases in the second EGR loop 31 may be at a higher pressure than the exhaust gases in the first EGR loop 25. The second exhaust gas recirculation loop 31 may comprise a second recirculation valve 35 which may control the amount of recirculation in the second EGR loop 31.

When the engine 3 is operating at or close to full load, for example during a period of high or maximum torque output, the EGR valve 29, 35 will typically be closed, reducing the EGR flow to zero. When the EGR valve 29, 35 is closed, condensation can form upstream of the valve 29, 35 as the EGR gases and EGR loop 25, 31 cool. When the torque demand on the engine is reduced, the EGR valve 29, 35 opens to reintroduce the EGR gases back to the inlet of the engine. As a result, the condensate that has accumulated upstream of the EGR valve 29, 35 is discharged through the EGR valve 29, 35 and into the inlet of the engine, which can affect the operation of the engine by altering the ratios of the reactants in the combustion chambers of the engine cylinders 15a-d. One problem in particular can occur in an LP-EGR loop, as the condensate is discharged into the turbocharger 11, which can damage the compressor 11a of the turbocharger 11.

In order to mitigate the condensate build-up near to the EGR valve 29, for example during period of high engine output, the EGR valve 29, 35 may be periodically opened to heat the EGR valve 29, 35 and the associated pipework of the EGR loop 25, 31, which helps reduce the rate of condensation and hence the amount of condensate discharged. For example, the EGR valve 29, 35 may be opened for a period of approximately 3 seconds every 30 seconds, or any other appropriate period/interval.

However, the EGR flow can reduce the air to fuel ratio in the cylinder, for example by increasing the ratio of nitrogen and/or carbon dioxide to oxygen in the air intake of the engine 3. As such, the output torque of the engine 3 may fluctuate as a result of EGR flow, which may be noticeable by the driver, especially at or near full engine load. Furthermore, in order to address the reduction of the air to fuel ratio in the cylinder and avoid fuel being wasted, the amount of fuel injected into the cylinder may be reduced in an effort to return the air to fuel ratio to the desired ratio. However, such an action results in a reduction in torque output of the engine.

Figure 2:
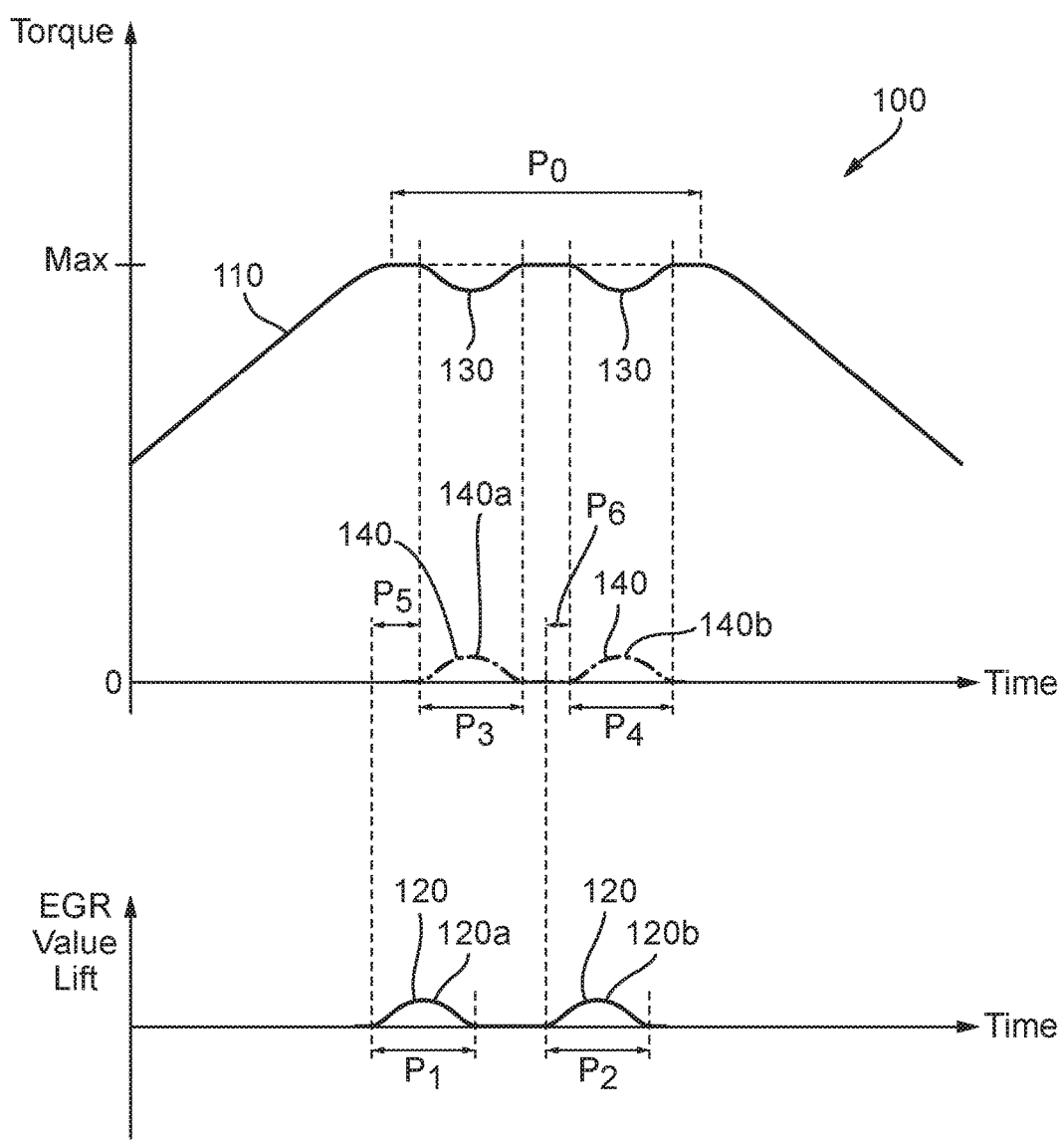
FIG. 2 shows a graphical representation of torque output against engine speed.

FIG. 2 shows a graphical representation of the output torque 110 of the engine 3 against time for an engine having at least one of the EGR loops 25, 31. FIG. 2 also shows the relationship between a valve operation event 120 of one of the EGR valves 29, 35, for example the EGR valve of a LP-EGR system, and a torque dip event 130 in the output torque 110. In order to overcome the torque dip event 130, the present disclosure provides a method 100 and system 37 for assisting the rotation of a rotary shaft using an electric machine in response to the operation of at least one EGR valve 29, 35.

In FIG. 2, the engine 3 is operating at or near to maximum output for a period P0. During the period P0, it is desirable to maintain the EGR valve 29, 35 in a closed position in order to maximize the air to fuel ratio in the combustion chamber of engine cylinders 15a-d such that the engine 3 operates at or near to its maximum output. However, as described above, the EGR valve 29, 35 may be periodically opened and closed in order to reduce the amount of condensate that forms upstream of the EGR valve 29, 35. As a result, the output of the engine 3 may dip as a result of the exhaust gases being recirculated into the intake of the engine 3.

Figure 3:
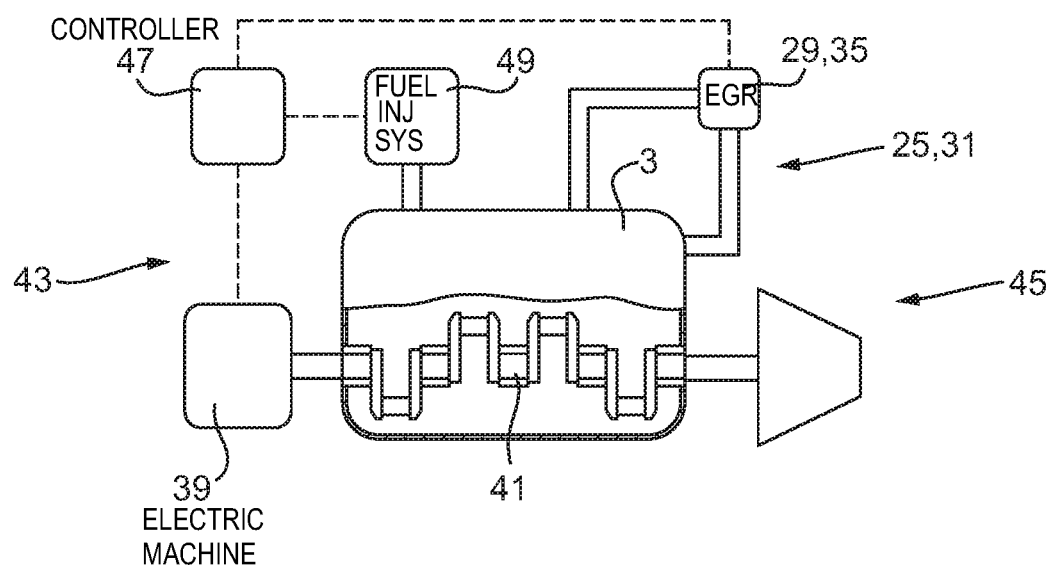
FIG. 3 shows a torque-assist system.

As shown in FIG. 3, the torque-assist system 37 comprises an electric machine 39, which is coupled to the rotary shaft 41, for example a crankshaft, of the engine 3. The electric machine 39 may be any appropriate type of electric machine 39 that is configured to assist the rotation of the crankshaft. For example the electric machine 39 may be an electric motor or an electric motor-generator. The electric machine 39 may be directly coupled, for example rigidly coupled, to the crankshaft. In another arrangement, the electric machine 39 may be coupled to the crankshaft by virtue of one or more intermediate members, for example an accessory drive member, such as a gear, a pulley, a drive belt or a drive chain. A clutch (not shown) may be provided in between the electric machine 39 and a crankshaft of the engine 3, such that the electric machine 39 may be selectively engaged and disengaged from the crankshaft depending on the instantaneous torque demand from the electric machine 39. When no torque-assist is required from the electric machine 39, it is advantageous to disengage the clutch to reduce drag on the engine 3.

In the arrangement shown in FIG. 3, the electric machine 39 is coupled to a front end 43 of the crankshaft of the engine 3. In the context of the present disclosure, the term "front end" is understood to mean the end of the engine 3 opposite the "rear end" 45, to which a transmission is coupled. As such, the electric machine 39 may be coupled to the end of the crankshaft that extends through the front of the engine casing and which may be configured to drive a synchronous drive of the engine 3. However, in one or more alternative arrangements, the electric machine 39 may be coupled to any appropriate portion of the crankshaft. For example, the electric machine 39 may be coupled to a portion of the crankshaft that extends from the rear end of the engine casing and which may be configured to drive the transmission.

The torque-assist system 37 comprises a controller 47 that is configured to activate and/or deactivate the electric machine 39. The controller 47 may be operatively connected to the EGR loop 25, 31 such that it is able to determine one or more operational parameters of the EGR valve 29, 35. For example, the controller 47 may be configured to determine at least one of: the extent by which the exhaust gas recirculation valve is opened, the flow rate of gas through the exhaust gas recirculation valve, the period for which the exhaust gas recirculation is open, i.e. the period in between the valve first allowing gases to flow through the valve and the valve preventing gas flow, and the rate by which the exhaust gas recirculation valve is opened and/or closed.

The controller 47 may be operatively connected to the engine 3 such that the controller 47 is able to determine one or more operational parameters of the engine 3. For example, the controller 47 may be configured to determine the output torque from the crankshaft of the engine 3. In this manner, the controller 47 may be configured to control the operation of the torque-assist system 37 depending on one or more operational parameters of the EGR loop 25, 31 and/or the engine 3. Additionally, the controller 47 may be operatively connected to a fuel injection system 49 of the engine such that the controller is able to control the amount of fuel injected into each of the cylinders 15a-d of the engine and/or the timing of a fuel injection event. For example, the controller 47 may be configured to reduce the amount of fuel injected into one or more of the cylinders and/or delay one or more fuel injection events in response to the operation of the EGR valve 29, 35.

The controller 47 is configured to determine the operational state of the EGR valve 29, 35 and activate the electric machine 39 in order to increase the torque applied to the vehicle transmission. For example, the controller may be configured to make a determination of whether the EGR valve 29, 35 is open or closed and control the operation of the electric machine 39 accordingly to compensate for the torque dip event 130, which would otherwise occur.

For example, where there is a first valve operation event 120a having an operational period P1, and a second valve operation event 120b having an operational period P2, the controller 47 may be configured to control the electric machine 39 such that the operational period P3 of a first torque-assist event 140a corresponds to the operational period P1 and the operational period P4 of a second torque-assist event 140b corresponds to the operational period P2. In the example shown in FIG. 2, the operational period P3 of the first torque-assist event 140a is equal to the operational period P1, and the operational period P4 of the second torque-assist event 140b is equal to the operational period P2. However, the operational period of the torque-assist event 140 may have any appropriate relationship with the operational period of the valve operation event 120. The level of torque-assist and/or the rate at which torque-assist is provided may be linked in a similar manner to the amount by which the EGR valve 29, 35 opens and/or the rate at which the EGR valve 29, 35 opens.

In the example shown in FIG. 2, the start of the first torque-assist event 140a is delayed by a period P5 from the start of the first valve operation event 120a. Similarly, the start of the second torque-assist event 140b is delayed by a period P6 from the start of the second valve operation event 120b. The period P5 is different from P6, as shown in FIG. 2. However, the period P5 may be the same as P6. In some situations, delaying the activation of the electric machine 39 may be beneficial since there is a delay between the EGR valve 29, 35 opening and the resultant reduction in the mass flow of oxygen entering the cylinders 15a-d. Furthermore, the injected fuel quantity may be reduced in line with the actual oxygen available for combustion in the cylinders 15a-d. In this manner, the operation of the electric machine 39 may be timed to correspond to the change in the air to fuel ratio in the combustion chamber of the cylinder 15a-d.

This disclosure provides a method 100 and a system 37 to counteract the torque dip 130 when the EGR valve 29, 35 is opened, for example to evaporate accumulated condensation. When opening the EGR valve 29, 35, the output torque 110 of the engine may be constrained due to a reduced proportion of oxygen in the air intake of the engine, for example at the smoke limit on a diesel engine. As a result, the fuel delivered to the cylinder may be reduced, for example to address the stoichiometric ratio of the reactants in the cylinder. In response to the operation of the EGR valve 29, 35 and/or the fuel injection system, the electric machine 39 is activated to assist the rotation of the crankshaft. In this manner, as the performance of the engine 3 starts to fall off, the electric machine 39 provides torque-assist to the crankshaft in order to compensate for the torque dip 130 experienced when the EGR valve 29, 35 opens.

It is beneficial to use the electric machine 39 to assist the rotation of the crankshaft as the electric machine 39 has a very fast torque response and so is well suited to balancing changes in the torque output of the engine. By using the electric machine 39 to assist the rotation of the crankshaft, the driver will not experience the torque dip 130 which may occur during a condensation purge. The present disclosure is therefore advantageous as it allows the regular purging of the condensate from the EGR loop 25, 31 without any noticeable performance loss. This can help to prevent the compressor 11a of the turbocharger 11 from becoming damaged by virtue of large quantities of condensate entering the intake of the compressor 11a.

It will be appreciated by those skilled in the art that although the invention has been described by way of example with reference to one or more examples, it is not limited to the disclosed examples and that alternative examples could be constructed without departing from the scope of the invention as defined by the appended claims.

While representative embodiments are described above, it is not intended that these embodiments describe all possible forms of the invention. The words used in the specification are words of description rather than limitation, and it is understood that various changes may be made without departing from the spirit and scope of the claimed subject matter. Additionally, the features of various implementing embodiments may be combined to form further embodiments that may not be explicitly described or illustrated.

What is claimed is:

1. A method for controlling an engine having a forced induction device, an exhaust gas recirculation (EGR) valve, and an electric machine coupled to a rotary shaft of the engine, comprising:
   operating the engine at full load with boost from the forced induction device;
   selectively opening the EGR valve during full load operation to purge condensation; and
   controlling the electric machine responsive to opening the EGR valve to boost torque to the rotary shaft.

2. The method of claim 1 wherein the forced induction device is a turbocharger having a compressor, and wherein the EGR valve is selectively opened to provide low pressure EGR flow of exhaust upstream of the compressor.

3. The method of claim 1 wherein controlling the electric machine comprises controlling the boost torque as a function of an extent by which the EGR valve opens.

4. The method of claim 1 wherein controlling the electric machine comprises delaying providing the boost torque to the rotary shaft by a time associated with induction time of EGR flow to cylinders of the engine.

5. The method of claim 1 wherein controlling the electric machine comprises controlling the boost torque in response to a period over which the EGR valve is open.

6. The method of claim 1 further comprising reducing fuel provided to the engine in response to opening the EGR valve.

7. The method of claim 6 further comprising controlling the electric machine to increase the boost torque in response to reducing the fuel provided to the engine.

8. The method of claim 1 wherein controlling the electric machine comprises controlling an amount of boost torque as a function of flow rate of gas through the EGR valve.

9. The method of claim 1 further comprising controlling the electric machine to reduce the boost torque in response to a request to reduce output torque of the engine.

10. A method of providing torque assistance to a rotary shaft of an internal combustion engine, comprising controlling an electric machine in response to operation of an exhaust gas recirculation valve to assist rotation of the rotary shaft.

11. The method of claim 10 wherein an amount of torque assistance provided by the electric machine is a function of a period over which the exhaust gas recirculation valve is open.

12. The method of claim 10 wherein an amount of torque assistance provided by the electric machine is a function of an extent by which the exhaust gas recirculation valve opens.

13. The method of claim 10 further comprising reducing a quantity of fuel injected into a cylinder of the engine in response to the operation of the exhaust gas recirculation valve.

14. The method of claim 13 wherein the torque assistance is provided when the quantity of fuel injected into a cylinder of the engine is reduced.

15. The method of claim 10 wherein there is a delay between opening of the exhaust gas recirculation valve and controlling the electric machine to assist rotation of the rotary shaft.

16. The method of claim 10 further comprising reducing an amount of torque assistance provided by the electric machine in response to a driver demand for reduced output torque from the engine.

17. An engine, comprising:
an exhaust gas recirculation (EGR) valve;
an electric machine coupled to a rotary shaft of the engine; and
a controller configured to activate the electric machine in response to operation of the EGR valve, wherein the controller is configured to control the electric machine to provide boost torque to a rotary shaft of the engine based on an amount of opening of the EGR valve.

18. The engine of claim 17 further comprising a forced induction device having a compressor, wherein the EGR valve controls flow of exhaust gas into the compressor of the forced induction device.

19. The engine of claim 17 wherein the controller is configured to delay torque provided by the electric machine after opening of the EGR valve so that the torque provided by the electric machine corresponds to a reduced torque associated with EGR flow into engine cylinders.

* * * * *